Figure 1:
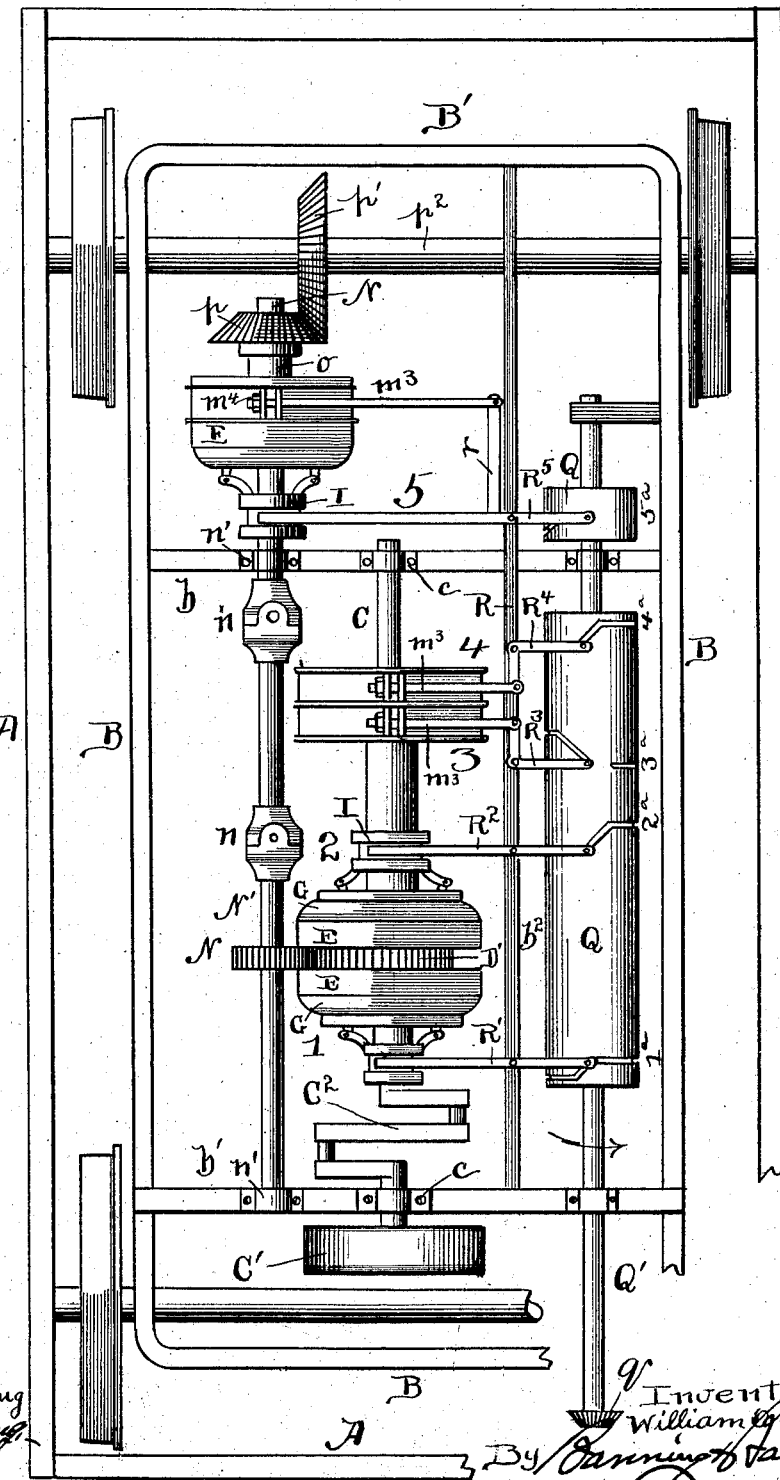

No. 757,261. PATENTED APR. 12, 1904.
W. O. BROWN.
POWER TRANSMISSION GEAR.
APPLICATION FILED MAY 2, 1903.
NO MODEL. 3 SHEETS—SHEET 1.

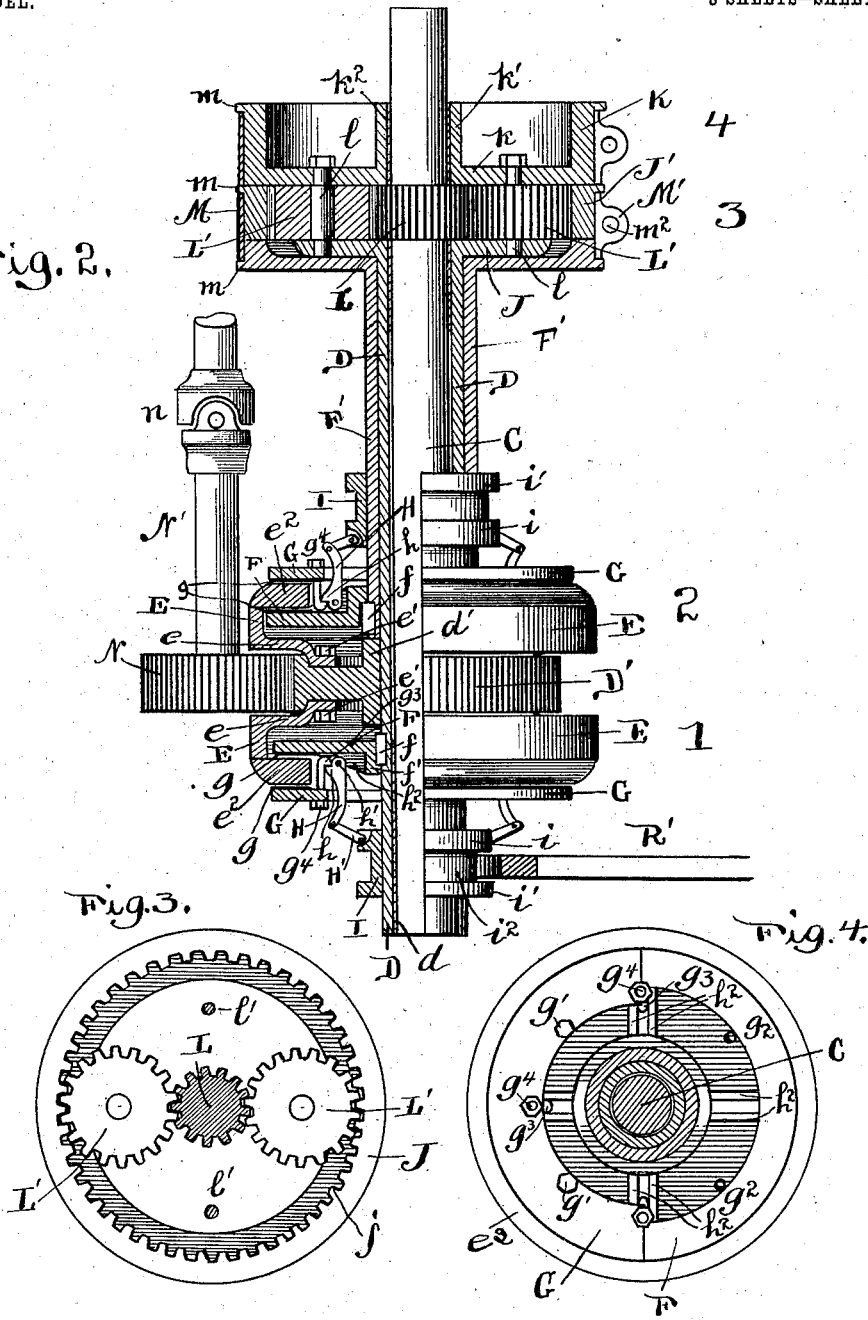

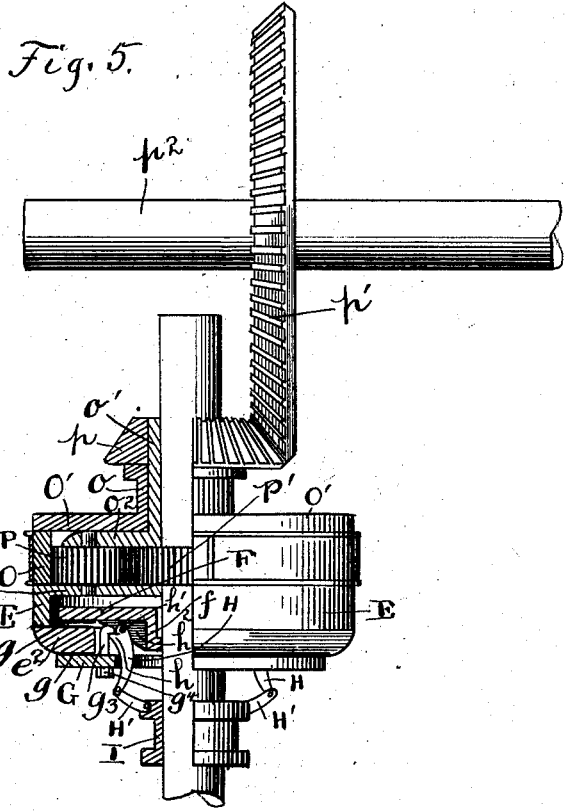
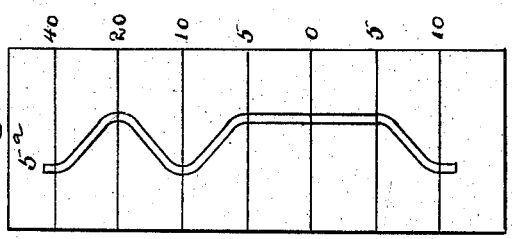
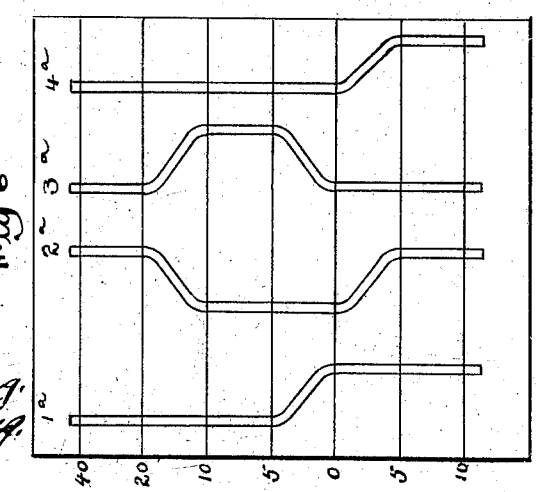

No. 757,261. Patented April 12, 1904.

UNITED STATES PATENT OFFICE.

WILLIAM O. BROWN, OF CHICAGO, ILLINOIS, ASSIGNOR TO NATIONAL HYDROCARBON CAR COMPANY, OF CHICAGO, ILLINOIS, A CORPORATION OF ILLINOIS.

POWER-TRANSMISSION GEAR.

SPECIFICATION forming part of Letters Patent No. 757,261, dated April 12, 1904.

Application filed May 2, 1903. Serial No. 155,280. (No model.)

*To all whom it may concern:*

Be it known that I, WILLIAM O. BROWN, a citizen of the United States, residing at Chicago, in the county of Cook and State of Illinois, have invented certain new and useful Improvements in Power-Transmission Gears, of which the following is a specification.

As shown and described in the present specification, this invention is applied to a street-railway car; but the invention is equally adapted for use with automobiles or other power-driven vehicles, and, in fact, is adapted for use in any connection in which it is desirable to have a gear and clutch mechanism for varying the degree of speed transmitted from the power-shaft to the motor-shaft.

The invention is so arranged that the speed may be increased or diminished automatically by the movement of a single controlling wheel or lever, which movement simultaneously operates the several clutches and brake mechanisms employed for varying the speed, and such movement will be uniform and certain under all conditions for the reason that it is impossible to connect one set of gears before another set has been disengaged, since such engagement and disengagement is entirely automatic in its operation and not dependent upon the carefulness and skill of the operator in charge.

The invention consists in the features of construction and combinations of parts hereinafter described and claimed.

In the drawings illustrating the invention, Figure 1 is a top or plan view showing the arrangement of the gears as employed on a street-railway car in which are employed clutches 1 and 2, gearings 3 and 4, and a combined clutch and gear mechanism 5, arranged in suitable relation to one another; Fig. 2, a half sectional view of the clutch mechanisms of 1 and 2 and gear mechanisms 3 and 4; Fig. 3, a top plan view of the gear mechanism 3; Fig. 4, a plan view of the clutch mechanisms 1 and 2, showing the outer ring or collar partly broken away; Fig. 5, a half sectional view of the gear and clutch mechanism 5; Figs. 6 and 7, diagrammatic plan views of the grooved surface of the controlling-cylinder for operating the various mechanisms; Fig. 8, a detail side view of the end of one of the controlling arms or levers adapted to operate within the grooved cylinder, and Fig. 9 a plan view of the same.

As shown, the power-transmission device of this invention is mounted on the framework of a street-railway car, such framework consisting of outer side supporting-rails A, outer end rails A', and an inner frame consisting of side rails B and end rails B', and across the inner frame are journaled supporting cross-rails $b$ and $b'$ and a longitudinal supporting-bar $b^2$, although the arrangement of supporting-frames and journal-supports may be adapted to suit the requirements of each particular case, and the framework herein described serves merely for purposes of illustration and is not intended in any way to limit the scope of the invention.

Between the journal-supports $b$ and $b'$ is a power-shaft C, supported within journal-boxes $c$ and provided at its end with a balance-wheel C' and further provided with a crank $C^2$, to which may be attached any suitable power mechanism, such as a hydrocarbon or fluid-pressure engine, and the location or arrangement of such engine in no way affects the present invention, which relates entirely to the mechanism by which the power is transmitted from the power-shaft to the motor-shaft.

Suitably located upon the shaft are the clutch mechanisms 1 and 2, which are similar in all their details, but are arranged in reverse relation to each other. The clutch mechanism 1 is carried by a sleeve D, which encircles the power-shaft and is supported therefrom by means of a bushing $d$, which arrangement allows the space between the shaft and the sleeve to be filled with oil, grease, or other lubricant. Rotatably mounted upon the inner sleeve D is a gear-wheel D', provided with a hub $d'$, and to the upper and lower side faces of the gear-wheel are fastened circular collars E, each provided with inwardly-extending flanges $e$, through which pass bolts $e'$, which serve to unite the flanged circular collars to the gear-wheel D'. Each of the circular collars is provided on its outer edge with an annular contact-flange $e^2$, inwardly extending. Within the space between the annular contact-flanges and the inwardly-extending attaching-flange are arranged interior circular friction-plates F, the inner one of which is keyed to an outer sleeve F', encircling the inner sleeve, and the outer one of which is keyed to the inner sleeve D' by means of keys $f$, arranged within hubs $f'$ on the respective friction-plates. It will thus be seen that one of the friction-plates is united to the inner sleeve, whereas the oppositely-disposed friction-plate is united to the outer sleeve, adapting the two friction contact devices for separate and independent operation with respect to one another. Exterior of the annular contact-flanges are located friction-rings G, suitably spaced, so that when in normal position their inner or contact faces will be out of contact with the annular contact-flanges, and on the friction-plates and on the contacting faces of the friction-rings are leather rings or disks $g$, adapted to press against the inner and outer faces of the contact-flange when one of the clutches is thrown into engagement with its coöperating contact-flange. The contact-rings are slidably mounted on bolts or pins $g'$, passing through holes $g^2$ in the friction-plates, which arrangement permits the friction-rings to be moved with respect to the friction-plates as one or the other of the clutches is operated. Intermediate the guide bolts or pins $g'$ are inwardly-extending engaging fingers $g^3$, united to the friction-rings by means of nuts $g^4$, as shown in Fig. 4, and coöperating with the engaging fingers are pressure-fingers H, each provided with a contact ledge or shoulder $h$ and pivotally mounted by means of pivot-pins $h'$ between radially-extending flanges $h^2$, formed on the outer faces of the friction-plates and extending outwardly from the hub thereon. To the free ends of the pressure-fingers are pivoted links H', which links in turn are pivoted to clutch-collars I, the collar operating clutch No. 1 being slidably mounted upon the inner sleeve D and the clutch-collar operating clutch No. 2 being slidably mounted on the outer sleeve F. Each of the clutch-collars is provided with an inner flange $i$ and an outer flange $i'$, leaving a groove or channel $i^2$ for the reception of the levers adapted to operate the respective clutches. An inward movement of one or the other of the slidable clutch-collars serves to impart pressure through links and pressure-arms to the inwardly-extending contact-fingers, thereby causing the friction-rings and friction-plates to be drawn together, contacting the inner and outer faces of one or the other of the contact-flanges and serving to firmly clutch the flange, and thereby establish connection between the gear-wheel D' and either the inner or the outer sleeve, depending upon which of the clutch mechanisms 1 and 2 is thrown into engagement.

The sleeve D terminates in a circular journal-plate J, and the sleeve F terminates in a gear-wheel J', which encircles the circular journal-plate and is provided on its inner face with a gearing $j$, and beyond the gear-wheel J' and in contact therewith is a recessed wheel K of the same size as the gear-wheel J' and provided on its lower side with a journal-plate $k$, from which extends a hub $k'$, which encircles a bushing $k^2$ on the power-shaft. Upon the shaft between the recessed wheel and the circular journal-plate J is a power-transmission gear-wheel L, which, as shown, bears a relation of one to four internal gearing of the gear-wheel J', and between the power-transmission gear-wheel and the gear-wheel D' are located intermediate gears L', two or more in number, and said gear-wheels are mounted upon journals $l$, rotatably mounted within the circular journal-plate and the interior flat face of the recessed wheel. The recessed wheel and journal-plate are united to one another at a fixed distance by means of bolts or pins $l'$, as shown in Fig. 3, which pass from the journal-plate to the flat face of the hollow wheel and are secured thereto.

Exterior of the gear-wheel J' are strap-brake mechanisms 3 and 4, each of which consists of a strap M passing around the wheel for which it is intended and held in place between annular ridges $m$, formed on the exterior rounded surfaces of the wheels. Each of the straps terminates in outwardly-turned ears M', provided with holes $m^2$, passing therethrough, and through said holes are extended brake-rods $m^3$, provided with adjustable nuts $m^4$. The straps are not of sufficient length to entirely encircle the wheels to which they are applied, so that a movement of the brake-rod causes the ends of the straps to be contracted toward one another, thereby setting the brake and preventing revolution of the wheel.

The power carried to the power-shaft revolves the power-transmission gear-wheel L, which in turn, as shown, transmits power to the interior gear of the wheel J', causing the latter to revolve at a speed one-fourth that of the power-shaft and in a direction opposite thereto. By throwing clutch No. 1 and setting the brake on No. 3 the gear-wheel J' will be held stationary and the interior sleeve D be caused to revolve in the same direction as the revolution of the power-shaft and at a speed equal to one-fourth of such revolution. The interior sleeve being brought into engagement by means of clutch 1 with the gear-wheel J' will consequently transmit to such gear-wheel one revolution for every four of the power-shaft.

If brake No. 3 be loosened and clutches Nos.

1 and 2 both thrown into engagement, the two sleeves will be locked together, forming, in effect, a single sleeve, and the intermediate gear-wheels, being locked against revolution, will serve to lock the sleeves to the power-shaft, causing the entire mechanism to revolve at the speed of the power-shaft and in the same direction. If clutch 2 and brake 4 be set, the gear-wheel J' will be revolved at a speed equal to one-fourth that of the power-shaft and in a direction opposite thereto.

The gear-wheel D' meshes with a transmission gear-wheel N, located on an intermediate shaft N', preferably provided with knuckle-joints $n$ and suitably supported in journal-boxes $n'$, and on the intermediate shaft is located a clutch and brake mechanism 5, the clutch mechanism being identical with that heretofore described and the gear and brake mechanism being arranged as follows: A gear-wheel O, similar to the gear-wheel J', is located above the circular collar E and provided with a flat outer face O', terminating in a neck $o$, which neck surrounds a sleeve $o'$, provided with a circular journal-plate $o^2$, similar to the journal-plate J, which plate lies within the flat face O' of the gear-wheel O and is supported thereby, and between the journal-plate and the circular collar E are intermediate gear-wheels P, meshing with the interior teeth of the gear-wheel O and with the teeth of a gear-wheel P' on the intermediate shaft, the gear-wheel P' having a relation of one to two, as shown, with the gear-wheel O, whereby two revolutions of the intermediate shaft will produce a single revolution of the gear-wheel O and neck carried thereby. On the sleeve $o'$ is a bevel-pinion $p$, meshing with a motor bevel-pinion $p'$ on the axle $p^2$, and, as shown, the relation between these two pinions is as one to four, although any other relation might be had.

The relation between the gear-wheels D' and N is as two to one, so that one revolution of the gear-wheel D' will produce two revolutions of the intermediate shaft. By throwing the clutch 5, which is keyed onto the intermediate shaft, and loosening the brake 5 the entire revolution of the intermediate shaft will be transmitted to the bevel-pinion, which in turn will transmit one revolution to the axle for every four revolutions of the intermediate shaft, the relation between the pinions being as one to four. By loosening the clutch and tightening the brake the sleeve $o'$ and bevel-pinion thereon will be revolved at a speed equal to one-half that of the intermediate shaft and in a direction opposite thereto. It will thus be seen that the clutch and brake 5 enable the speed to be varied still further, and acting in combination with the mechanism on the power-shaft increases the efficiency of the entire device.

In order that the operation of the several clutches and brakes shall be coördinated, a grooved cylinder Q has been provided, mounted upon a controlling-shaft Q', which latter is provided with a pinion $q$ at its end, which is adapted to receive motion from a wheel or lever in the hands of the operator. The surface of the cylinder is provided with a series of grooves $1^a$, $2^a$, $3^a$, and $4^a$, as shown in Fig. 6, and a similar cylinder Q, as shown in Fig. 7, is provided with a groove $5^a$ for operating the combined clutch and brake mechanism 5. The clutch mechanisms are provided with straight levers R', $R^2$, and $R^5$, and the brake mechanisms are provided with bell-crank levers $R^3$ and $R^4$, all of the levers being pivoted on a rod or bar R, extending longitudinally of the frame of the car. Each of the clutch-levers R', $R^2$, and $R^5$ is forked at its end to encircle the clutch-collar with which it coöperates, and the lever $R^5$ is provided with an arm $r$, set at an angle thereto, onto which arm is pivoted a rod $m^2$, hitherto described, which operates the brake mechanism of clutch No. 5. Similar rods $m^3$ are pivoted to the ends of the bell-crank levers $R^3$ and $R^4$ for operating the brake mechanisms 3 and 4. At the end of each of the rods hitherto described is a centrally-pivoted roller $r'$, downwardly extending into one of the slots in the controlling-cylinder, so that the rotary motion of the cylinder will cause the levers to be moved with respect to the slots in the cylinder, so that the action of each one of the levers will depend upon the shape of the slot by which it is controlled. As shown in Figs. 6 and 7, the controlling-cylinders are arranged to vary the speed imparted to the axle from five miles per hour up to forty and give a reverse speed, when desired, of from five to ten miles an hour, although of course these speeds are merely given for purposes of illustration and in no wise limit the character of the invention. The line zero illustrates the point at which all of the levers stand when the car is at rest and no motion is being imparted to the shaft. It will be noted that at the line 5 the levers controlling clutch No. 1 and brake No. 3 will have been moved to set the mechanism which they control and that as the speed is increased to ten miles an hour the clutch and brake mechanism No. 5 will be moved to loosen the brake and tighten the clutch, that as the controlling-cylinders are still further turned to increase the speed to twenty miles an hour the clutches $H^2$ will both remain tight, No. 3 will be loosened, and No. 5 will be reversed, loosening the clutch and tightening the brake. To secure a speed of forty miles an hour, Nos. 1, 2, 3, and 4 will remain as at twenty and No. 5 will be reversed, loosening the brake and tightening the clutch. In order to reverse, the mechanism 2 and 4 are thrown and shown in the diagram and 5 remains as at zero. By a further reverse turn of the controlling-cylinder the position of No. 5 is reversed, loosening the brake and tightening the clutch, which doubles the reverse speed and gives a reverse speed of ten miles an hour.

It will thus be seen that the arrangement of slots in the controlling-cylinders makes the operation entirely coördinated and depending upon a single act of the operator, so that the different mechanisms will always be operated at the correct time and without the necessity for remembering each particular combination of movements necessary to increase or diminish the speed of the car or other vehicle.

The coördination and coöperation of two head of gears on coacting shafts, each head of gear adapted to receive and impart varying speeds of rotation and each operated by suitable clutch mechanisms, enables a great variation in the speed imparted to the shaft by the different combinations of movement that may be effected between the two heads of gears. The ultimate speed finally imparted to the driving-axle will depend upon the relative arrangement of the two heads of gears with respect to one another, and in view of the plurality of speeds that may be obtained with either of the heads of gear independently it is plain that the variations which may be obtained by the two heads operating together will be greatly increased.

Although the invention has been described with considerable particularity as to detail, and although the various devices have been given a certain proportionate relation to each other as to the size of gears and the speed of shafts, it will be understood that these figures are given entirely for the purpose of illustration and are not intended to be absolute or to limit in any way the nature of the invention, since the size or relation of the different gear-wheels may be changed indefinitely to suit the requirements of each particular case.

What I regard as new, and desire to secure by Letters Patent, is—

1. In power-transmission gears, the combination of a power-shaft, a rigid gear-wheel mounted on the power-shaft, intermediate gear-wheels meshing therewith, a gear-wheel exterior of the intermediate wheels and provided with interior teeth meshing with the intermediate gear-wheels, two clutch mechanisms one connected with the intermediate gear-wheels and the other connected with the exterior gear-wheel, and a power-transmission gear-wheel adapted to be engaged by both the clutches, substantially as described.

2. In power-transmission gears, the combination of a power-shaft, a rigid gear-wheel mounted on the power-shaft, intermediate gear-wheels meshing therewith, a gear-wheel exterior of the intermediate wheels and provided with interior teeth meshing with the intermediate gear-wheels, two clutch mechanisms one connected with the intermediate gear-wheels and the other connected with the exterior gear-wheel, a power-transmission gear-wheel adapted to be engaged by both the clutches, a brake mechanism adapted to hold the intermediate gear-wheels against revolution around the power-shaft, and a brake mechanism adapted to engage the exterior gear-wheel, substantially as described.

3. In power-transmission gears, the combination of a power-shaft, a fixed gear-wheel mounted on the power-shaft, an inner sleeve on the power-shaft, an outer sleeve exterior of the inner sleeve and terminating in an exterior gear-wheel provided with internal teeth, intermediate gear-wheels rotatably connected with the inner sleeve and adapted to mesh with the fixed gear-wheel and the exterior gear-wheel, a power-transmission gear-wheel, a clutch mechanism connected with the interior sleeve, and a clutch mechanism connected with the exterior sleeve, both clutch mechanisms being adapted to engage the power-transmission gear-wheel, substantially as described.

4. In power-transmission gears, the combination of a power-shaft, a fixed gear-wheel mounted on the power-shaft, an inner sleeve on the power-shaft, an outer sleeve exterior of the inner sleeve and terminating in an exterior gear-wheel provided with internal teeth, intermediate gear-wheels rotatably connected with the inner sleeve and adapted to mesh with the fixed gear-wheel and the exterior gear-wheel, a power-transmission gear-wheel, a clutch mechanism connected with the interior sleeve, a clutch mechanism connected with the exterior sleeve, both clutch mechanisms being adapted to engage the power-transmission gear-wheel, a brake mechanism adapted to hold the intermediate gear-wheels against revolution around the power-shaft, and a brake mechanism adapted to engage the exterior gear-wheel, substantially as described.

5. In power-transmission gears, the combination of a power-shaft, a fixed gear-wheel on the power-shaft, an inner sleeve on the power-shaft terminating in an outwardly-extending journal-plate, an exterior sleeve encircling the interior sleeve and terminating in an exterior gear-wheel provided with interior teeth, a recessed wheel rotatably mounted on the power-shaft, intermediate gear-wheels meshing with the fixed gear-wheel and the exterior gear-wheel and rotatably mounted between the recessed wheel and the journal-plate, a power-transmission gear-wheel rotatably mounted on the interior sleeve, a clutch mechanism on the interior sleeve, and a clutch mechanism on the exterior sleeve both clutch mechanisms adapted to engage the power-transmission gear-wheel to transmit power from one of the sleeves, substantially as described.

6. In power-transmission gears, the combination of a power-shaft, a fixed gear-wheel on the power-shaft, an inner sleeve on the power-shaft terminating in an outwardly-extending journal-plate, an exterior sleeve encircling the interior sleeve and terminating in an exterior gear-wheel provided with interior teeth, a recessed wheel rotatably mounted on the power-shaft, intermediate gear-wheels meshing with the fixed gear-wheel and the exterior gear-wheel and rotatably mounted between the recessed wheel and the journal-plate, a power-transmission gear-wheel rotatably mounted on the interior sleeve, a clutch mechanism on the interior sleeve, a clutch mechanism on the exterior sleeve both clutch mechanisms adapted to engage the power-transmission gear-wheel to transmit power from one of the sleeves, a brake mechanism encircling the exterior gear-wheel, and a brake mechanism encircling the recessed wheel, the brake mechanisms being adapted to prevent rotation of the sleeves, substantially as described.

7. In power-transmission gears, the combination of two shafts, a gear mechanism operating between the shafts, planetary gears having predetermined ratios to one another on each of the shafts adapted to receive and impart varying speeds, and clutch mechanisms on each of the shafts adapted to work in conjunction with the respective planetary gears to vary the speeds imparted thereby, substantially as described.

8. In power-transmission gears, the combination of a power-transmitting and a power-receiving shaft having a coöperative relation to one another, a gear mechanism coöperating between the shafts, gears on each of the shafts having predetermined ratios to one another, each of the gears being adapted to receive and to impart varying degrees of rotation and adapted to lock with its respective shaft and rotate therewith, and means for varying the degrees of speed imparted from the shafts through their respective gears, substantially as described.

9. A power-transmission gear consisting of a power-shaft and an intermediate shaft, a fixed gear-wheel on the power-shaft, a power-transmission gear-wheel rotatably mounted with respect to the power-shaft, two clutch mechanisms adapted to engage with the power-transmission gear-wheel, both of the clutch mechanisms adapted to receive motion from the fixed gear-wheel, an intermediate power-transmission gear-wheel meshing with the power-transmission gear-wheel, a fixed gear-wheel mounted on the intermediate shaft, a pinion rotatably mounted with respect to the intermediate shaft and adapted to receive full speed of revolution from the power-shaft and reduced speed of revolution from the fixed gear thereon, and means for changing the speed of the revolution imparted to the pinion, substantially as described.

10. In power-transmission gears, the combination of a power-shaft, a fixed gear-wheel mounted on the power-shaft, a transmission gear-wheel revolubly mounted on the power-shaft, an exterior gear-wheel revolubly mounted on the shaft and provided with interior teeth, intermediate gear-wheels meshing with the fixed gear-wheel and the exterior gear-wheel, two clutch mechanisms one of them connected with the exterior gear-wheel and the other one connected with the intermediate gear-wheels both clutch mechanisms adapted to impart motion to the power-transmitting gear-wheel, a power-transmission shaft adapted to receive motion from the power-transmission gear-wheel, a pinion revolubly mounted on the power-transmission shaft, a gear mechanism on the power-transmission shaft, and a clutch mechanism adapted to transmitting revolution to the pinion through the gear mechanism, substantially as described.

11. In power-transmission gears, a combined brake and clutch mechanism consisting of a rotatable shaft, a fixed gear-wheel mounted on the shaft, an exterior gear-wheel encircling the shaft, provided with interior teeth, intermediate gear-wheels meshing with the fixed gear-wheel and the external gear-wheel, a mounting for the intermediate gear-wheels, a pinion on the mounting, a brake mechanism adapted to engage the exterior gear-wheel, a clutch mechanism adapted to engage the mounting for the intermediate pinions, a controlling-cylinder provided in its face with a groove, and a lever connected with the clutch and brake mechanism and adapted to enter the groove in the cylinder and be controlled thereby to operate the brake and clutch mechanisms, substantially as described.

12. In power-transmission gears, the combination of a power-shaft, a fixed gear on the power-shaft, an external gear-wheel provided with interior teeth, said external gear-wheel having a predetermined ratio to the fixed gear-wheel, intermediate gear-wheels meshing with the fixed gear-wheel and the external gear-wheel, a power-transmission gear-wheel rotatably mounted with respect to the power-shaft, two clutch mechanisms adapted to engage the power-transmission gear-wheel, one of the clutch mechanisms connected with the external gear-wheel and the other clutch mechanism connected with the intermediate gear-wheels, a brake mechanism adapted to prevent rotation of the external gear-wheel and a brake mechanism adapted to hold the intermediate gear-wheels in fixed relation with respect to the shaft, a power-transmission shaft, a gear-wheel on the power-transmission shaft meshing with the power-transmission gear-wheel, a fixed gear-wheel on the power-transmission shaft, an external gear-wheel rotatably mounted with respect to the power-transmission shaft and provided with interior teeth, intermediate gear-wheels meshing with the fixed gear-wheel and the teeth of the external gear-wheel, the fixed gear-wheel and exterior gear-wheel having a predetermined ratio different from the ratio of the fixed gear-wheel, and external gear-wheel on the power-shaft, a clutch mechanism adapted to lock the external gear-wheel to the shaft, and a brake mechanism adapted to prevent rotation of the external gear-wheel, substantially as described.

WILLIAM O. BROWN.

Witnesses:
SAMUEL W. BANNING,
WALKER BANNING.